Nov. 25, 1924.                                                              1,517,046
C. W. WRIGHT
SHOVEL CONSTRUCTION
Filed Sept. 15, 1924
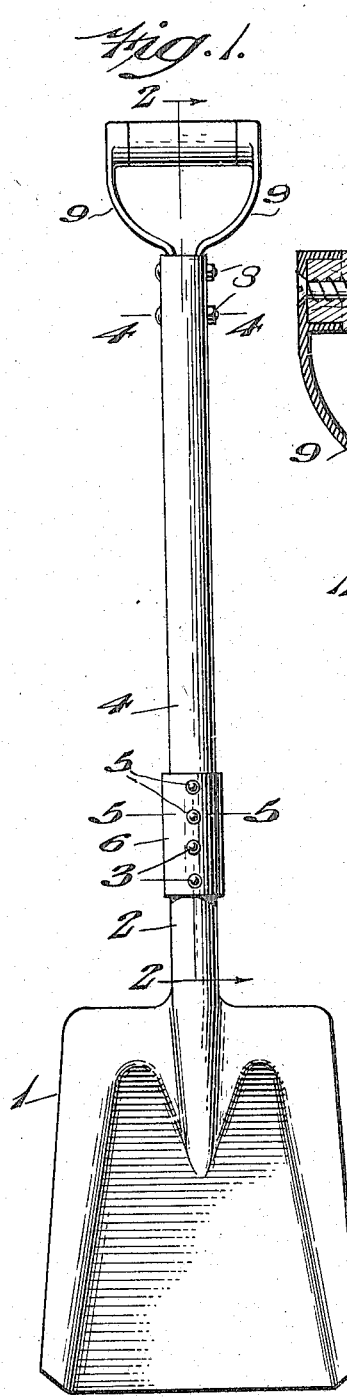
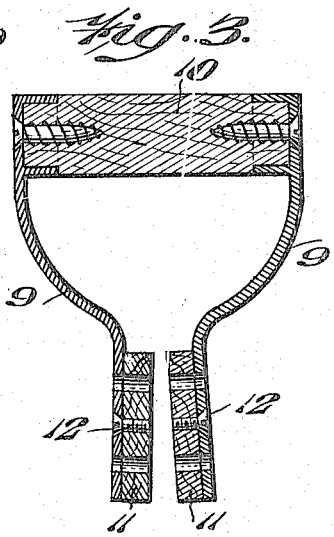
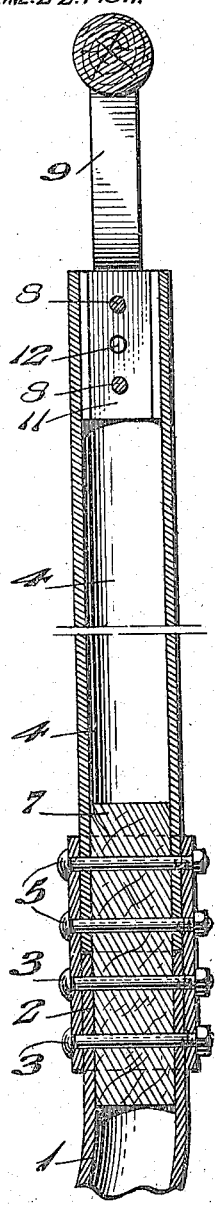
INVENTOR:
Charles W. Wright
BY
ATTORNEYS Patented Nov. 25, 1924.

1,517,040

UNITED STATES PATENT OFFICE.

CHARLES WESLEY WRIGHT, OF HOLMESBURG, PHILADELPHIA, PENNSYLVANIA.

SHOVEL CONSTRUCTION.

Application filed September 15, 1924. Serial No. 737,665.

*To all whom it may concern:*

Be it known that I, CHARLES W. WRIGHT, a citizen of the United States, residing at Holmesburg, Philadelphia, in the county of Philadelphia and State of Pennsylvania, have invented a certain new and useful Shovel Construction, of which the following is a specification.

This invention, stated in its broadest terms, relates to shovels, spades, and similar implements and has more especial relation to an implement of this character in which the parts are detachably engaged for substitution and renewal.

The leading object of the present invention is to provide a device of the character stated in which is embodied simplicity, durability, efficiency and which may be manufactured at relatively little expense.

A further object of the present invention resides in the provision of general arrangement, construction and arrangement of parts for attaining the results sought by the leading object. Other and further objects not at this time appearing will be hereinafter more specifically referred to.

The invention consists of the novel construction hereinafter described and finally claimed.

The nature, characteristic features and scope of the invention will be more fully understood from the following description taken in connection with the accompanying drawings forming part hereof, and in which:

Fig. 1 is a face view of a shovel embodying the features of the invention.

Fig. 2, is a fragmentary view in section taken upon the line 2—2 of Fig. 1.

Fig. 3, is a view in section of the handle part detached.

Fig. 4, is a view in horizontal section taken upon the line 4—4 of Fig. 1, and

Fig. 5, is a similar view taken upon the line 5—5 of Fig. 1.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings a shovel designated by the numeral 1 is disclosed although obviously a spade, scoop, or similar implement may be substituted for the shovel. The neck 2 of the shovel is apertured as clearly shown in Fig. 2 for the passage therethrough of bolts 3. The numeral 4 designates a tubular stem of the same diameter as the neck 2 and the lower end of part 4 is also laterally apertured for the passage therethrough of bolts 5. In order to couple together the neck 2 and stem 4, use is made of a sleeve 6 which is caused to engage around the meeting ends of the stem 4 and neck 2 and which sleeve is apertured laterally for the passage therethrough of the bolts 3 to 5. In order to provide rigidity of parts a plug 7 of wood, as clearly shown in Fig. 2, is introduced within the stem 4 and neck 2 to bridge the meeting ends of said parts 4 and 2, it being understood that the bolts 3—5 pass through such plug so that all of the parts may be rigidly clamped together as clearly illustrated. The upper end of stem 4 is also laterally apertured for the passage therethrough of bolts 8.

The handle of the shovel is clearly shown in Fig. 3 and comprises a pair of spaced metal strips 9 secured together at their tops by a hand grip 10. The lower ends of said strips 9 are apertured for the passage therethrough of the bolts 8. The lower ends of the strips 9 each carry a block of wood 11, which blocks are secured to strips 9 by means of srews 12. When the lower ends of the strips 9 with their blocks 11 are inserted within the top of stem 4 a snug fit is effected with the various apertures of the stem 4, strips 9, and blocks 11 in register. The bolts 8 are then employed to securely clamp the parts together as clearly shown in Fig. 1.

By the above arrangement, construction and connection of parts either a handle or shovel parts, or both, may be substituted or arranged in a few moment's time without the expense of buying an entire new shovel, spade, scoop or like implement. The parts above described are so constructed that rigidity is provided throughout the major portion of the shovel which is most desirable in an article of this kind.

Having thus described my invention, what I claim as new and desire to secure by Letters Patent, is:

1. An implement of the character stated comprising a tubular member the lower end of which is laterally apertured, a shovel part having a tubular neck arranged to abut beneath the lower end of said tubular member, which neck is laterally apertured, a laterally apertured sleeve arranged around the meeting ends of said member and neck, a laterally apertured plug within and bridging the meeting ends of said member and neck and bolts passing through the respective apertured parts for detachably clamping same together.

2. An implement of the character stated comprising a tubular member the upper end of which is laterally apertured, a handle comprising a pair of straps connected at their tops by a hand grip and provided at their lower ends with spaced, laterally apertured blocks, said straps yielding sufficiently when engaging within said member to cause said blocks to abut, and bolts passing through the respective apertured parts for detachably clamping same together.

3. An implement of the character stated comprising a tubular member the lower end of which is laterally apertured, a shovel part having a tubular neck arranged to abut beneath the lower end of said tubular member, which neck is laterally apertured, a laterally apertured sleeve arranged around the meeting ends of said member and neck, a laterally apertured plug within and bridging the meeting ends of said member and neck, bolts passing through the respective apertured parts for detachably clamping same together, and a hand grip detachably secured to the upper end of said tubular member.

4. An implement of the character stated comprising a tubular member the upper end of which is laterally apertured, a handle comprising a pair of straps connected at their tops by a hand grip and provided at their lower ends with spaced, laterally apertured blocks, said straps yielding sufficiently when engaging within said member to cause said blocks to abut, bolts passing through the respective apertured parts for detachably clamping same together, and a shovel part detachably secured to the lower end of said tubular member.

In testimony whereof, I have hereunto signed my name.

CHARLES WESLEY WRIGHT.

Witnesses:
E. HAYWARD FAIRBANKS,
JOSEPH A. CLARK.